No. 790,420. PATENTED MAY 23, 1905.
H. J. BAYARD.
RAILWAY CAR.
APPLICATION FILED APR. 30, 1904.
2 SHEETS—SHEET 2.
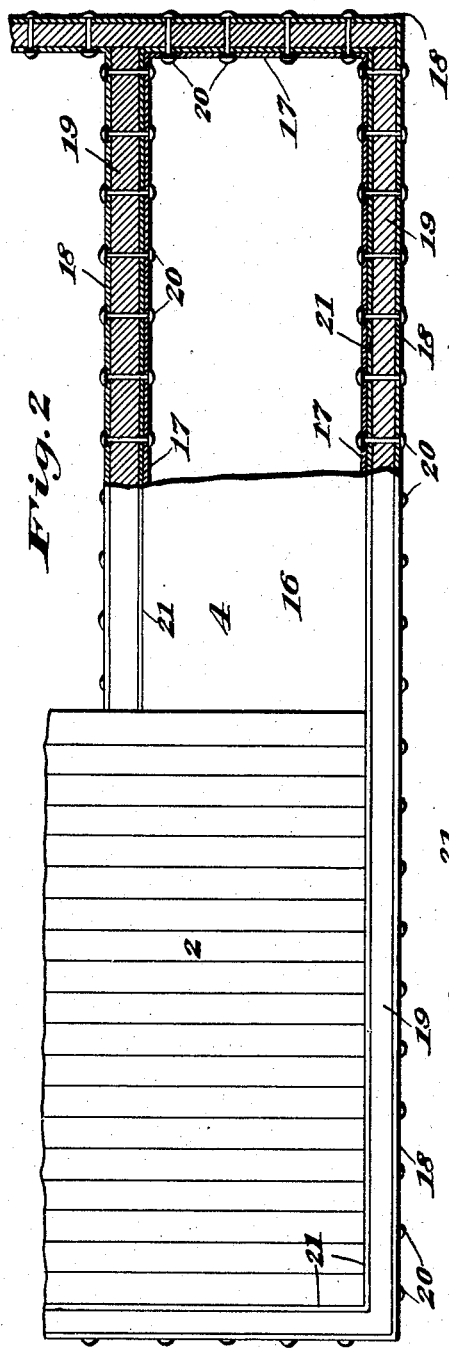
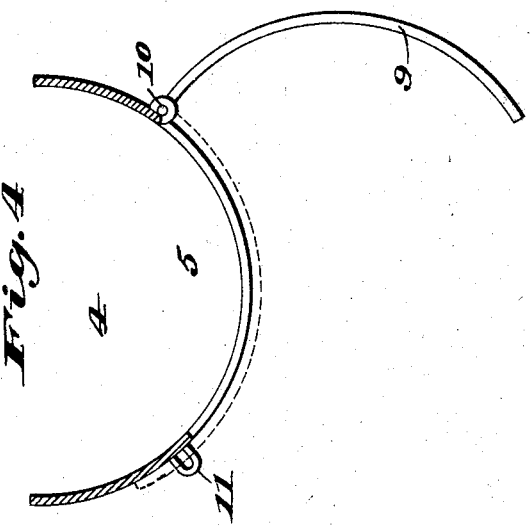
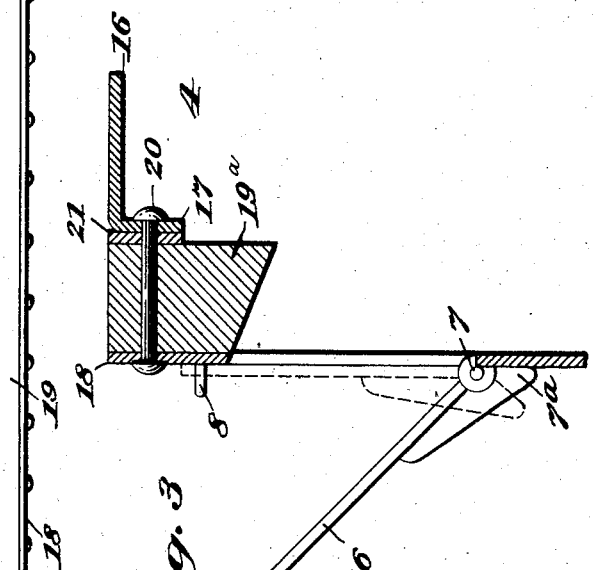
Witnesses
C. Caplinger
C. S. Kellup
Inventor
Hyram J. Bayard,
By J. R. Caplinger
Attorney No. 790,420.

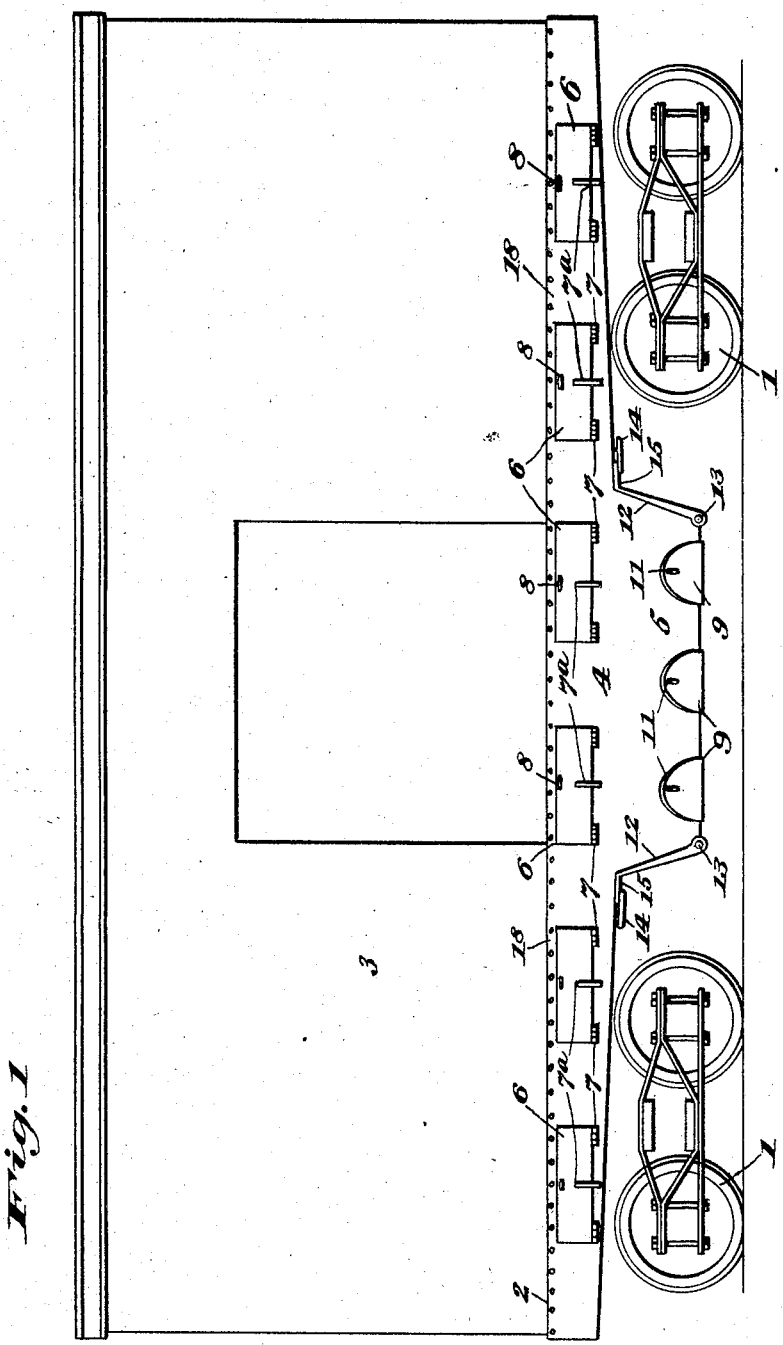

Patented May 23, 1905.

UNITED STATES PATENT OFFICE.

HYRAM J. BAYARD, OF CHICAGO, ILLINOIS.

RAILWAY-CAR.

SPECIFICATION forming part of Letters Patent No. 790,420, dated May 23, 1905.

Application filed April 30, 1904. Serial No. 205,837.

*To all whom it may concern:*

Be it known that I, HYRAM J. BAYARD, a citizen of the United States, residing at Chicago, Cook county, Illinois, have invented certain Improvements in Railway-Cars, of which the following is a specification.

This invention relates to certain improvements in railway-cars, and has for its object to provide a car of a simple and improved nature and of a strong and inexpensive structure which shall be capable of use for the transportation of freight of various kinds at one and the same time, so that when the platform of the car is employed for carrying freight of a light and bulky character other means are provided for carrying an increased volume of freight in addition to that which is carried on the platform, so that the capacity of the car is greatly increased.

The invention consists in certain novel features of the construction, combination, and arrangement of the several parts of the improved railway-car whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a side elevation showing a freight-car constructed according to my invention; and Fig. 2 is a partial plan view showing a portion of the car-platform, the body of the car being omitted. At one end of this view the car-floor is omitted and a portion of the tank and sills beneath the same is shown in section. Fig. 3 is an enlarged section taken transversely through the tank in a plane along one side of one of the filling-doors, the said door being shown in opened position. Fig. 4 is an enlarged vertical section taken through the lower part of the tank and showing the discharge-door in opened position.

As shown in the views, 1 indicates the car-wheels, and 2 the platform supported thereon. 3 indicates the car-body above the platform.

As herein shown, the car is of the box freight-car type; but it is evident my improvements may be embodied in cars of various kinds as well as in box-cars.

Along the side of the platform and embedded at its upper part therein is a metallic tank 4, the end portions of which are shallow, with inclined bottoms sloping downward toward the central part of the car, at which point the tank is made deeper, as seen at 5, and is extended downward below the platform in the space between the wheels.

At suitable locations along the outer side of the tank 4, in the shallow end portions thereof and also in its deeper central part, are produced openings adapted to be closed by doors 6 6, hinged, as seen at 7, at their lower edges and having openings for the passage of bails or staples 8 on the side of the tank, through which bails or staples may be passed padlocks or the like for holding the doors in closed position.

The doors 6 when opened are adapted for the passage of such freight as grain, coal, and the like to be stored in the tank 4, and in order to permit the door at each opening to serve in place of a guide for assisting in loading or filling the tank each door 6 has at its lower part a downwardly-extended lug or projection $7^a$ for engagement on the side of the tank to prevent extreme opening of the door, so that the door when opened is caused to stand in an upwardly-inclined position, as seen in full lines in Fig. 3. When doors 6 are closed, they fit flush on the outer side of the tank, as seen in dotted lines in Fig. 3.

In the bottom of the deeper central part 5 of the tank are produced a number of discharge-openings, as seen in Fig. 4, which are adapted to be closed by doors 9, hinged at 10 on the inner side of the tank and having their outer portions perforated for the passage of bails or staples 11, to which may be secured padlocks or the like, and in the ends of said deeper central portion 5 of the tank are other openings for the discharge of freight, and these end openings are adapted to be closed by doors or covers 12, hinged, as seen at 13, at the bottom of the tank, with portions 15 fitting, when the doors are closed, flush on the under side of the shallow end portions of the tank and having ends for engagement by turn-buttons 14 or the like, whereby said doors or covers 12 may be held closed.

The outer side of the tank 4 forms the side of the platform, and in practice one of the tanks constructed as above described will be located along each side of the platform, so that each tank will take the place of the sill commonly extended in car construction along the side of the platform, and in order to afford a light and at the same time exceedingly strong and rigid structure for the tanks and platform I build each tank in as a part of the platform itself.

As shown in the drawings, the sides and ends of the tank 4 are extended up continuously and vertically with their upper edges flush with the top of the platform 2, as seen at 18 in Figs. 1 and 2, and the top of the tank is formed of a single piece or sheet of metal, as indicated at 16, the edges of which are provided with downwardly-directed flanges 17, extended round them and spaced inside of the upwardly-extended sides 18 of the tank, so as to afford room between the parts to receive wooden strips or sills 19, which are extended lengthwise of the platform and correspond in position and function with the longitudinal sills ordinarily employed in car construction, but which may, by reason of the added strength due to the peculiar arrangement of the tanks, be made of considerably less thickness than is required in the ordinary arrangement.

20 20 indicate rivets or bolts extended through the flanges 17, parts 18, and sills or strips 19 for rigidly holding the structure together. In the drawings I have also shown metal strips 21 extended along between the flanges 17 of the tank-top 16 and the wooden sills or strips 19. These strips 21 afford increased strength and stiffness, but are not essential to my invention. An arrangement of wooden strips or pieces 19$^a$ is also employed at the ends of the car-platform, between the outer walls of each tank at its ends and the flange of its top plate or cover, the said strips or pieces 19$^a$ being held in position by means of rivets passed through them and also through the metal parts at the opposite sides and being in all ways similar to the strips or pieces 19 except that they are extended transversely across the ends of the platform. The transverse strips or pieces 19$^a$ correspond in position and function with the similarly-arranged parts provided in ordinary car construction. The floor may be laid upon the car-platform in any desired way. If desired, it may be laid across the longitudinal sills or strips 19 and may be nailed or otherwise secured thereto.

From the above description it will be seen that the improved car constructed according to my invention is of an extremely simple and inexpensive nature and is especially well adapted for use by reason of its strength due to the fact that the tanks 4 when extended along the sides of the platform form braces therefor, so as to greatly stiffen the structure without greatly adding to the weight thereof. The peculiar arrangement of the tanks with outer walls at the outer surface of the platform also permits a simple and inexpensive arrangement of the filling-openings and the doors for closing them and permits of increasing the size of each tank 4, since the space which in former constructions is taken up by the sill along the side of the platform outside of the tank is in my present construction included within the tank itself by extending the outer wall of the tank along the side of the platform. The structure is also such that an additional load of freight may be carried in the tanks when the body of the car is filled with light and bulky freight or a mixed load may be carried without inconvenience in loading or unloading, since the grain, coal, or other freight in the tanks may be loaded through the upper doors 6 without requiring access to the interior of the car and may also be unloaded through the end openings and bottom openings when doors 12 and 9 are opened, also without disturbing the contents of the car-body. In unloading the car it will usually be preferable to run the car over a chute or pocket beneath the track, into which chute or pocket the end and bottom discharge openings in the deeper part of the tank may be arranged to deliver the coal, grain, or other freight held in the tank.

It will also be obvious from the above description that the improved car is capable of considerable modification without material departure from the principles and spirit of the invention, and for this reason I do not wish to be understood as limiting myself to the precise form and arrangement of the several parts of the device as herein set forth in carrying out my invention in practice.

Having thus described my invention, what I claim, and desire to secure by Letters Patent, is—

1. A railway-car having a platform provided with a metallic tank extended along its side, the outer side wall of the tank forming the outer side of the platform and being extended up to the upper part of the platform, a metal sheet extended across the top of the tank and having an edge flange extended down inside of but spaced away from the outer side walls of the tank and wooden sills or strips extended lengthwise of the platform and interposed and held in the space between said edge flange and the outer side wall of the tank, and said tank being provided with an inlet and with an outlet.

2. A railway-car having a platform provided with a metallic tank extended along its side and having shallow end portions and a deeper central part, said deeper central part having means for discharging the contents of the tank and the outer side wall of the tank being extended along the outer side of the platform and having openings produced in it at intervals, and doors hinged at their lower edges to said outer side wall of the tank beneath said openings and adapted to close the openings, said doors having projections adapted, when the doors are opened, to engage on the side of the tank and maintain the doors in inclined positions.

Signed in the presence of two witnesses, at Chicago, Illinois, this 28th day of April, 1904.

HYRAM J. BAYARD.

Witnesses:
   J. D. CAPLINGER,
   C. S. KELLEY.